United States Patent [19]

Lee

[11] Patent Number: 4,985,915
[45] Date of Patent: Jan. 15, 1991

[54] METHOD FOR INTERFACING BETWEEN A KEY-PHONE SYSTEM AND A KEY-PHONE SUBSCRIBER

[75] Inventor: Jung-Sup Lee, Seoul, Rep. of Korea

[73] Assignee: Samsung Electronics Co., Ltd., Kyung Ki-Do, Rep. of Korea

[21] Appl. No.: 371,823

[22] Filed: Jun. 27, 1989

[30] Foreign Application Priority Data

Jun. 27, 1988 [KR] Rep. of Korea ................ 1988-7801

[51] Int. Cl.$^5$ ............................................. H04M 1/00
[52] U.S. Cl. .................................................... 379/165
[58] Field of Search ........................... 379/156, 93, 165

[56] References Cited

U.S. PATENT DOCUMENTS 4,551,583 11/1985 Sekiguchi et al. .................. 379/165

Primary Examiner—Stafford D. Schreyer
Attorney, Agent, or Firm—Robert E. Bushnell

[57] ABSTRACT

There is disclosed a data interfacing method in a key-phone system and a subset key-phone system capable of speedily processing an event generated from a key-phone system by use of two data interfacing sections between the key-phone system and subset key-phone. The invention to increase the data interfacing speed includes: a first step for reading a state data of data received from a data receiver 43 and checking whether said received data is effective; a second step for reading the data from said data receiver 43 when the received data in said first step is effective, thereafter checking whether it is null data. If it is null data the system returns to said first step; a third step for processing the read data when it is not null data in said second step and sequentially outputting the first and second processed data to a data transmitter means 45, thereby ending the process; and a fourth step for outputting an error message to the key-phone when a parity error is generated in said first step and, then, ending the process.

20 Claims, 3 Drawing Sheets

Fig. 2
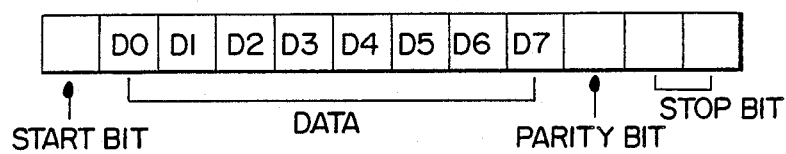
Fig. 3
| T1 | T2 | T3 | T4 | T5 |
|---|---|---|---|---|
| 3ms | 3ms | 0.5ms | 3ms | 0.5ms |
Fig. 4A
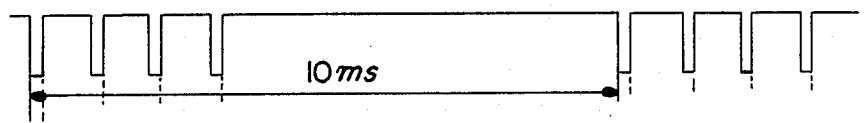
Fig. 4B
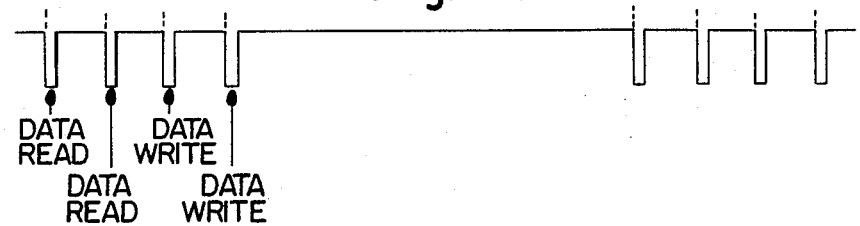

METHOD FOR INTERFACING BETWEEN A KEY-PHONE SYSTEM AND A KEY-PHONE SUBSCRIBER

BACKGROUND OF THE INVENTION

The present invention relates to a method for interfacing between a key-phone system and a subset key-phone, and more particularly to a method for increasing data interfacing speed between a key-phone system and a subset key-phone.

In general, a central processing unit (CPU) of a key-phone system assigns 10 ms to each key-phone subscriber to execute a given service successfully for all events generated from the key-phone. In a conventional key-phone system, when a data interfacing process between a central processing unit and a key-phone subscriber is executed, every universal async receiver and transmitter (hereinafter referred to as UART) covers eight subscribers, so that a response time for processing the corresponding events with the central processing unit according to the events generated from the key-phone system is very slow, and when the key-phone employs an liquid crystal display (LCD) for displaying a state initiated by the subscriber, the processing speed is so slow that it is displayed on the LCD means very late. In addition to these disadvantages, the prior art has another disadvantage that when a user inputs the key with a high speed, a response time for late key input key is too slow to take proper action.

SUMMARY OF THE INVENTION

It is accordingly an object of the present invention to provide a data interfacing method capable of speedily processing an event generated from a key-phone system by use of two data interfacing sections between a key-phone system and a subset key-phone.

To achieve the object according to one aspect of the invention, the method includes:

a first step for reading state data of data received from a data receiver and checking whether said received data is effective;

a second step for reading the data from said data receiver when the received data in said first step is effective, thereafter checking whether it is null data. If it is null data, then the system returns to said first step;

a third step for processing the read data when it is not null data in said second step and sequentially outputting first and second processed data to the data transmitter, thereby ending the process; and a fourth step for outputting an error message to the key-phone when a parity error is generated in said first step and, then, ending the process.

BRIEF DESCRIPTION OF THE DRAWINGS

For a better understanding of the invention and to show how the same may be carried into effect, reference will now be made, by way of example, to the accompanying diagrammatic drawings, in which:

FIG. 2 shows a data shape diagram specifically for transmitting data according to the invention;

FIG. 3 illustrates specifically a data shape diagram for interfacing the system according to the invention;

FIG. 4 illustrates a data access timing chart according to the invention; and

DETAILED DESCRIPTION OF THE INVENTION

A preferred embodiment of the present invention will now be described in detail hereinafter with reference to the accompanying drawings.

Figure 1A:
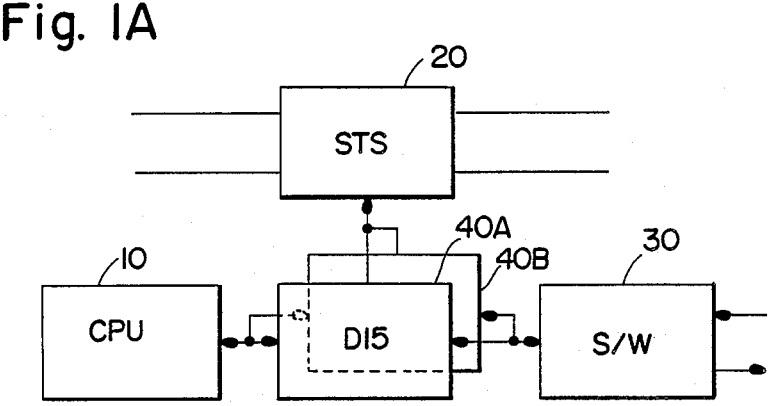
FIG. 1 shows a system block diagram for carrying out the invention.
Figure 1B:
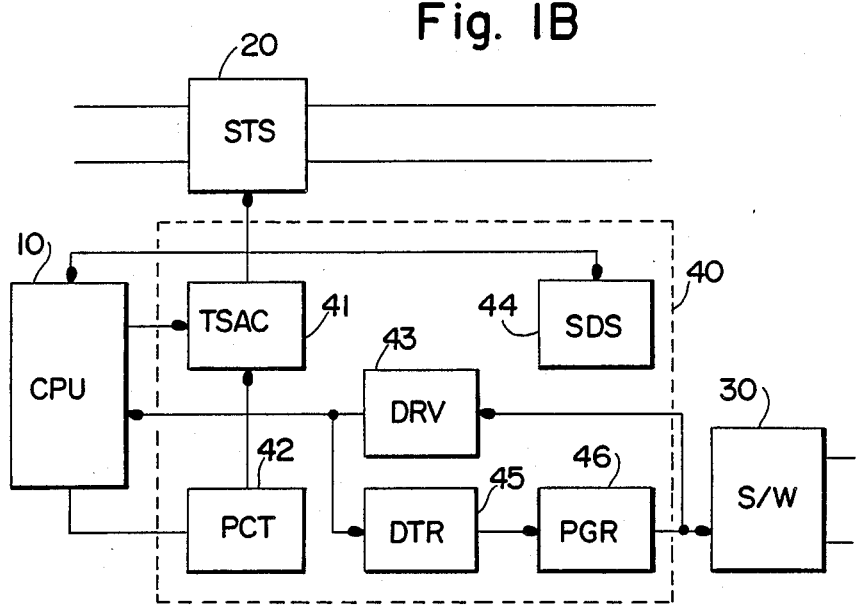

Referring to FIG. 1 illustrating specifically a system block diagram of the invention, the inventive method has a central processing unit (CPU) 10, a speech transmitting section (STS) 20, a switching section (S/W) 30, and a data interfacing section (DIS) 40, wherein said data interfacing section includes a time slot assignment circuit (TSAC) 41, a port controller (PCT) 42, a data receiver (DRV) 43, a state displaying section (SDS) 44, a data transmitter (DTR) 45, and a pulse generator (PGR) 46.

Said central processing unit 10 employs two data interfacing sections 40A, 40B in order to process events of subscribers from the switching section 30, in which said each data interfacing section can cover four key-phone subscribers. Therefore, with two data interfacing sections 40A, 40B, the system covers all together eight key-phone subscribers, assigning a 40 ms period to each key-phone subscriber respectively to interface therebetween.

Referring to FIG. 4(B) illustrating more specifically the data interfacing section of FIG. 4(A), the time slot assignment circuit 41 assigns a communication channel of a subscriber under the control of said central processing unit 10. The port controller 42 generates an enable signal to TSAC 41 as well as selects one of the eight subscribers under the control of CPU 10 by means of a decoding part (not shown). The data receiver 43 latches data of the subscriber inputted through said switching means 30. In addition, the state displaying section 44 displays a state signal of receiving data and its parity bit inputted to said CPU 10 from said data receiver 43. The data transmitter means 45 transmits data received from said CPU 10 after being processed. The pulse generator 46 outputs to the switching section 30 data of which band width is controlled by said pulse generator, the data being received from the data transmitter 45.

FIG. 2, being a data shape diagram, of 12 bits, wherein: a first bit is used for a start-bit; a second bit through a ninth bit are effective data for all events generated from the key-phone system; a tenth bit is an even parity bit for sensing a data error while being transmitted; and eleventh and twelfth bits are stop-bits.

FIG. 3, being a data shape diagram for interfacing a system, shows that the system executes two data transmitting times T1, T2 and has two intervals of time T3, T5 for 10 ms period.

FIG. 4 is a data access timing diagram for first and second data interfacing. The CPU 10 reads out the state data through said state displaying means 44 for every 10 ms period. Thereafter, CPU 10 reads out again data received from the data receiver 43 to process and write it to the data transmitter 45 for two times.

Figure 5:
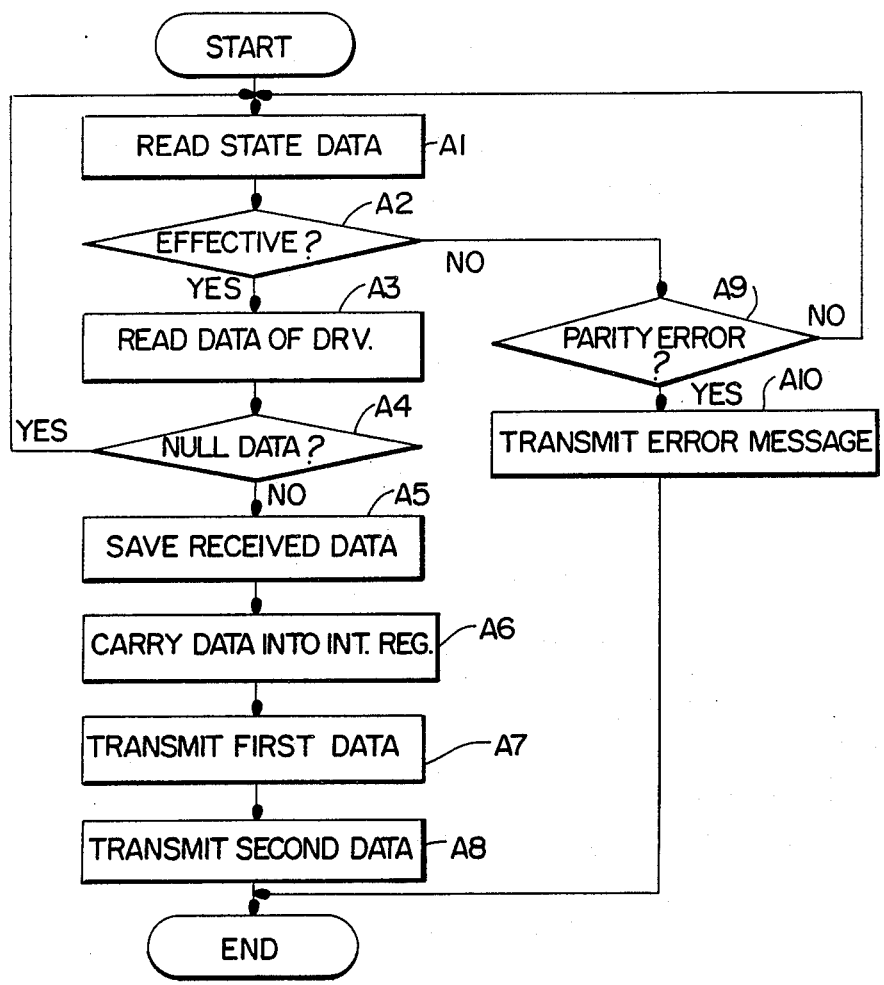
FIG. 5 illustrates a flow chart specifically describing the invention.

FIG. 5 is a flow chart for interfacing between a key-phone system and a subset key-phone according to the invention, wherein the interfacing includes:

a first step for reading state data of data received from the data receiver 43 and checking whether the received data is effective;

a second step for reading the data from said data receiver 43 when the received data in said first step is effective, thereafter checking whether it is null data. If it is null data the system returns to the first step;

a third step for processing the read data when it is not null data in said second step and sequentially outputting first and second processed data to the data transmitter means 45, thereby ending the process; and a fourth step for outputting an error message to the key-phone when a parity error is generated in said first step and, then, ending the process.

The preferred embodiment of the invention will now be described in more detail hereinafter, with reference to the FIG. 1 to FIG. 5.

The CPU 10, being a one-chip micro processor, is connected with eight key-phone subscribers and two data interfacing sections 40A, 40B to execute a data interfacing service with a 40 ms period to each key-phone subscriber (preferably, one data interfacing section can cover four key-phone subscribers with its interfacing service).

A sequence of data interfacing is explained herein below, with reference to the accompanying drawings. Since one data interfacing section can cover four subscribers, CPU 10 controls the switching device 30 to connect each key-phone subscriber with data interfacing section 40 sequentially. Data from the key-phone subscriber, having a data shape as shown in FIG. 2, is latched at the data receiver 43 by way of switching device 30. Hence, data receiver 43 cancels a start-bit and stop-bit from the received data as in FIG. 2, saves the parity bit into the state displaying section 44 and latches only effective data D0 through D7.

State displaying section 44 displays a state of whether there exist any data to receive and transmit, and at the same time displays a parity error state of the received data. Then, the CPU 10 reads out with a 40 ms period the latched data through said state displaying section 44, and stores the data into the memory, thereafter executing corresponding processing steps.

After the CPU 10 processes the received data from the key-phone subscriber in the same process as executed above, the data is written into the data transmitter 45 two times, Moreover, the parity bit is added in the data transmitter 45, and the start bit and stop bit is inserted automatically, thereby being inserted into the pulse generator 46. Pulse generator means 46 controls the pulse width of the transmitting data as shown in FIG. 2 and, then, transmits said data to the switching device 30 in order to transmit it to a corresponding subscriber. When a process of the data interfacing service, as shown above, is ended, the CPU 10 selects the next key-phone subscriber by controlling the port controller 42 and follows the abovedescribed steps.

FIG. 4 is a waveform diagram illustrating a sequence of data interfacing between a key-phone system and a key-phone subscriber, wherein the CPU 10 executes the data interfacing operation to any subscriber of the four subscribers in the manner of FIG. 4(A) through the first data interfacing section 40A, and, at the same time, executes the data interfacing operation even to the other subscribers in the manner of FIG. 4(B) through the second data interfacing section 40B. Therefore, the CPU 10 can execute the data interfacing operation simultaneously for two key-phone subscribers for 10 ms as shown in FIG. 4(A) and FIG. 4(B) through the data interfacing section 40A, 40B.

Accordingly, the CPU 10 of the key-phone system carries out the data interfacing operation to eight key-phone subscribers with a 40 ms period through two data interfacing sections 40A, 40B. The detailed sequence of the interfacing process of the invention is explained hereinbelow. The data receiver means 43 receives data in the form of FIG. 2 through the switching means 30 to apply the parity bit to the state displaying device 44 and to latch only effective data.

In a step A1, the CPU 10 reads the data state of the state displaying device 44 with a 10 ms period, and checks in a step A2 whether the read data state is effective or not. Said data state is constructed of eight bit data, wherein a D1-bit, being a RxRDY bit, is set if the data corresponding to a key-phone subscriber is latched in data receiver 43, so that the CPU 10 can recognize the latch state of the received data by setting said D1-bit. Further, when a D3-bit, being a parity check bit, is set, the CPU 10 determines the data in latch state as error data.

Said D1 and D3-bit become reset when those are read once by the CPU 10, and prepare to save the data state of the next data. Therefore, in said step A2, when the D1-bit is set and D3-bit is effective according to the result of checking the D1 and D3-bit of the state data, the effective data presently being latched in the data receiver 43 is read by proceeding to a step A3. After the completion of step A3, whether the received data is null data or not is checked in a step A4, in which if the key-phone subscriber didn't press the corresponding key, a null data 00H is input, therefore, the operation returns to the step A1 which is the initial state.

When the null data is not present at a step A4, the operation jumps to an object address to save the data read at the step A3, and proceeds to a step A5, thereby jumping again to an object address of a memory having the transmitting data so as to transmit the processed data to the key-phone subscriber. Thereafter, the data is read out to be carried into an internal register of the CPU 10 in a step A6. Next, proceeding to a step A7 and A8, the system transmits first transmitting data of two transmitting data to the data transmitter means 45 and then also transmits the second data to said data transmitter means, thereafter ending the process.

In addition, when the received state data is not in an effective state in step A2, whether it is a parity error state or not is checked at a step A9. If, that is to say, the parity error bit D3 is in a set state, then the CPU 10 accounts it to be an error state and proceeds to a step A10 to transmit an error message to the key-phone subscriber, thereafter ending the process. In step A9, when the parity error bit is not checked, the system returns to the step A1 to repeat processes described above.

The invention has an advantage of increasing the data interfacing speed by processing eight key-phone subscribers within a 40 ms period by use of two data interfacing sections as above described. The invention has another advantage of simplifying the software routine for processing the data interfacing, and effecting a reduced cost and compact-system by employing a customized IC for the data interfacing sections.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method for interfacing between a key-phone system and a key-phone subscriber, said key-phone system having a first and a second data interfacing section for executing a data interfacing operation, wherein said method comprises:
- a first step for reading data state for received data from data receiver means, checking whether said received data is effective, and generating a parity error if the received data is not effective;
- a second step for reading the received data from said data receiver means when the received data in said first step is effective, and thereafter returning to said first step if the data read from said data receiver is null data;
- a third step for processing the data read when the data read is not null data in said second step and sequentially outputting first and second processed data to data transmitter means, and thereby ending the process; and
- a fourth step for providing an error message to a key-phone when a parity error is generated in said first step and, then, ending the process.

2. The method of claim 1, further comprised of canceling stop and start bits, saving a parity bit, and latching data bits of said data received after receiving said data from a key-phone subscriber.

3. The method of claim 1, further comprised of simultaneously performing for a plurality of key-phone subscribers, each step of reading said data state of data received.

4. The method of claim 1, further comprised of simultaneously performing for a plurality of key-phone subscribers, each step of reading data state of said data received from different ones of a plurality of key-phone subscribers for each of said data interfacing sections.

5. The method of claim 1, further comprised of simultaneously performing for a plurality of key-phone subscribers for each of said data interfacing sections, each step of reading said data state of said data received and then reading the data from said data receiver means from different ones of said plurality of key-phone subscribers for each of said data interfacing sections.

6. The method of claim 1, further comprised of simultaneously performing for different ones of a plurality of key-phone subscribers for each of said data interfacing sections, each step of reading said data state of said data received from said different ones of said plurality of key-phone subscribers, within a ten millisecond interval.

7. A method for interfacing between a key-phone system and a key-phone subscriber, said key-phone system having a first and a second data interfacing section for executing a data interfacing operation, wherein said method comprises the steps of:
- sequentially connecting each of a plurality of key-phone subscribers with corresponding ones of a plurality of data interfacing sections having data receiver means and data transmitter means;
- reading a data state of data received from the data receiver means, checking whether said received data is effective, and generating a parity error if the received data is not effective;
- reading the data received from said data receiver means when the data received is effective, and thereafter returning to a preceding step if the data read from said data receiver means is null data;
- processing the data read when the data read is not null data and sequentially outputting the first and second processed data to data transmitter means, and thereby ending the process; and
- providing an error message to a key-phone when a parity error is generated and, then, ending the process.

8. The method of claim 7, further comprised of canceling start and stop bits, saving a parity bit, and latching data bits of said data received after reception of said data received from a key-phone subscriber.

9. The method of claim 7, further comprised of simultaneously performing for a plurality of key-phone subscribers, each step of reading said data state of data received.

10. The method of claim 7, further comprised of simultaneously performing for a plurality of key-phone subscribers for each of said data interfacing sections, each step of reading said data state of data received from different ones of a plurality of key-phone subscribers.

11. The method of claim 7, further comprised of simultaneously performing for a plurality of key-phone subscribers for each of said data interfacing sections, each step of reading said data state of said data received and then reading the data from said data receiver means from different ones of said plurality of key-phone subscribers for each of said data interfacing sections.

12. The method of claim 7, further comprised of simultaneously performing for different ones of a plurality of key-phone subscribers for each of said data interfacing sections, each step of reading said data state of said data received from said different ones of said plurality of key-phone subscribers, within a ten millisecond interval.

13. The method of claim 7, further comprised of:
- simultaneously performing said step of reading said data state of said data received and then reading the data received from said data receiver means for a different one of a plurality of key-phone subscribers for each of said data interfacing sections; and
- canceling start and stop bits, saving a parity bit, and latching data bits of said data received after receiving said data from a key-phone subscriber.

14. A method for interfacing between a key-phone system and a key-phone subscriber, comprising the steps of:
- reading a data state of data received, checking whether said received data is effective, and generating a parity error if the received data is not effective;
- reading the received data when said received data is effective, and thereafter returning to a preceding step if the data read is null data;
- processing the data read when the data read is not null data to provide process data and sequentially transmitting the processed data, and then ending the process; and
- providing an error message to a subscriber when a parity error is generated and then, ending the process.

15. The method of claim 14, further comprised of canceling start and stop bits, saving a parity bit, and latching data bits of said data received after receiving said data from a key-phone subscriber.

16. The method of claim 14, further comprised of simultaneously performing for a plurality of key-phone subscribers, each step of reading said data state of data received from a plurality of key-phone subscribers.

17. The method of claim 14, further comprised of simultaneously performing for a plurality of key-phone subscribers, each step of reading said data state of said data received from different ones of a plurality of key-phone subscribers for each of said data interfacing sections.

18. The method of claim 14, further comprised of simultaneously performing step of reading said data state of said data received and then reading the data from said data receiver means for different ones of a plurality of key-phone subscribers for each of said data interfacing sections.

19. The method of claim 14, further comprised of simultaneously performing for a plurality of key-phone subscribers, each step of reading said data state of said data received for different ones of a plurality of key-phone subscribers for each of said data interfacing sections, within a ten millisecond interval.

20. The method of claim 14, further comprised of:
simultaneously performing for a plurality of key-phone subscribers, each step of reading said data state of said data received and then reading the data from said data receiver means for different ones of a plurality of key-phone subscribers for each of said data interfacing section; and
canceling start and stop bits, saving a parity bit, and latching data bits of said data received after receiving said data from a key-phone subscriber.

* * * * *